United States Patent
Lee (10) Patent No.: US 8,010,859 B2
(45) Date of Patent: Aug. 30, 2011

(54) DATA TRANSMITTING AND RECEIVING SYSTEM

(75) Inventor: Jung-Bae Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1075 days.

(21) Appl. No.: 11/779,977

(22) Filed: Jul. 19, 2007

(65) Prior Publication Data

US 2008/0022179 A1   Jan. 24, 2008

(30) Foreign Application Priority Data

Jul. 24, 2006   (KR) .................. 10-2006-0069336

(51) Int. Cl.
*H04L 1/18* (2006.01)
(52) U.S. Cl. .................. 714/748; 714/792; 714/795
(58) Field of Classification Search ............. 714/748, 714/794, 792, 795
See application file for complete search history.

(56) References Cited

U.S. PATENT DOCUMENTS 7,088,793 B1 * 8/2006 Mickelson et al. ........... 375/341

FOREIGN PATENT DOCUMENTS

| JP | 04328912 | 11/1992 |
| JP | 2003332951 | 11/2003 |
| KR | 1019960003401 B1 | 3/1996 |
| KR | 1020010009569 A | 2/2001 |

* cited by examiner

*Primary Examiner* — Fritz Alphonse
(74) *Attorney, Agent, or Firm* — Volentine & Whitt, PLLC (57) ABSTRACT

A system having a transmission unit transmitting an output data signal formed from output data and related error detection code and a corresponding receiving unit. The output data signal is pre-emphasized by a pre-emphasis driver in the transmission unit. The receiving unit includes an equalizer equalizing the received output data signal and an error detector analyzing the error detection code to determine whether a bit error is present in the received data. Upon successive data transmission failures either an equalization coefficient in the equalizer or a pre-emphasis coefficient in the pre-emphasis driver are changed.

16 Claims, 5 Drawing Sheets

DATA TRANSMITTING AND RECEIVING SYSTEM

BACKGROUND OF THE INVENTION

1. Field of the Invention

The present invention relates to a data transmitting and receiving system. More particularly, the present invention relates to a data transmitting and receiving system using an equalizer.

This application claims the benefit of Korean Patent Application No. 2006-69336, filed Jul. 24, 2006, the subject matter of which is hereby incorporated by reference.

2. Description of Related Art

Devices for inputting/outputting data are prone to errors (typically, referred to as "bit errors") in the transmission of data caused, for example, by various random and systematic noise effects.

The frequency of bit errors in a data communication system may be expressed in terms of a "bit error rate (BER)", which is the ratio of incorrectly received data bits relative to a total number of data bits received during predetermined period of time. For example, a data channel having a BER of $10^{-4}$ will receive an average of one incorrect (i.e., errant) data bit per every $10^4$ data bits communicated through the channel. The BER of a given channel will vary with the speed of data transmission, channel length, and so on. Also, bit errors are mostly caused by noise in communication lines. Thus, a channel may be defined in its data communication capabilities by its inherent noise characteristics which determine most bit errors. In order to provide reliable data communication within contemporary systems, a data channel should have a BER in the order of $10^{-12}$ or lower.

As technology has developed, numerous techniques for eliminating or reducing noise have been proposed, but it remains practically impossible to completely eliminate all bit errors. Therefore, various error detection and/or correction codes are being conventionally employed to improve the performance of data channels. Of the many error detection/correction codes, one of the simplest and most widely-used is referred to as a cyclic redundancy checker (CRC).

A CRC method determines a check value for detecting bits errors in data received through a channel. More specifically, an initial CRC value is calculated in accordance with given data, added to the data, and transmitted from a transmitter. Thereafter, a new CRC value is calculated on the basis of the data actually received by a receiver at the other end of the channel. The initial CRC value and the new CRC value are compared within the receiver or a circuit associated with the receiver. When the two CRC values are determined to be different, bit error induced by noise in data channel are indicated. When an excessive or uncorrectable number of bit error(s) are detected, an error signal may be returned from receiver to the transmitter and data may be re-transmitted. Assuming that most of the bit errors apparent in the first data transmission are due to random noise effects, the re-transmission often results in effective data communication.

Systematic noise in a data channel, such as inter-channel crosstalk, inter-symbol interference (ISI), and simultaneous switching noise (SSN), poses a different set of considerations and implicates a number of different bit error detection and correction schemes. This is particularly true for high speed data communication systems.

Figure 1:
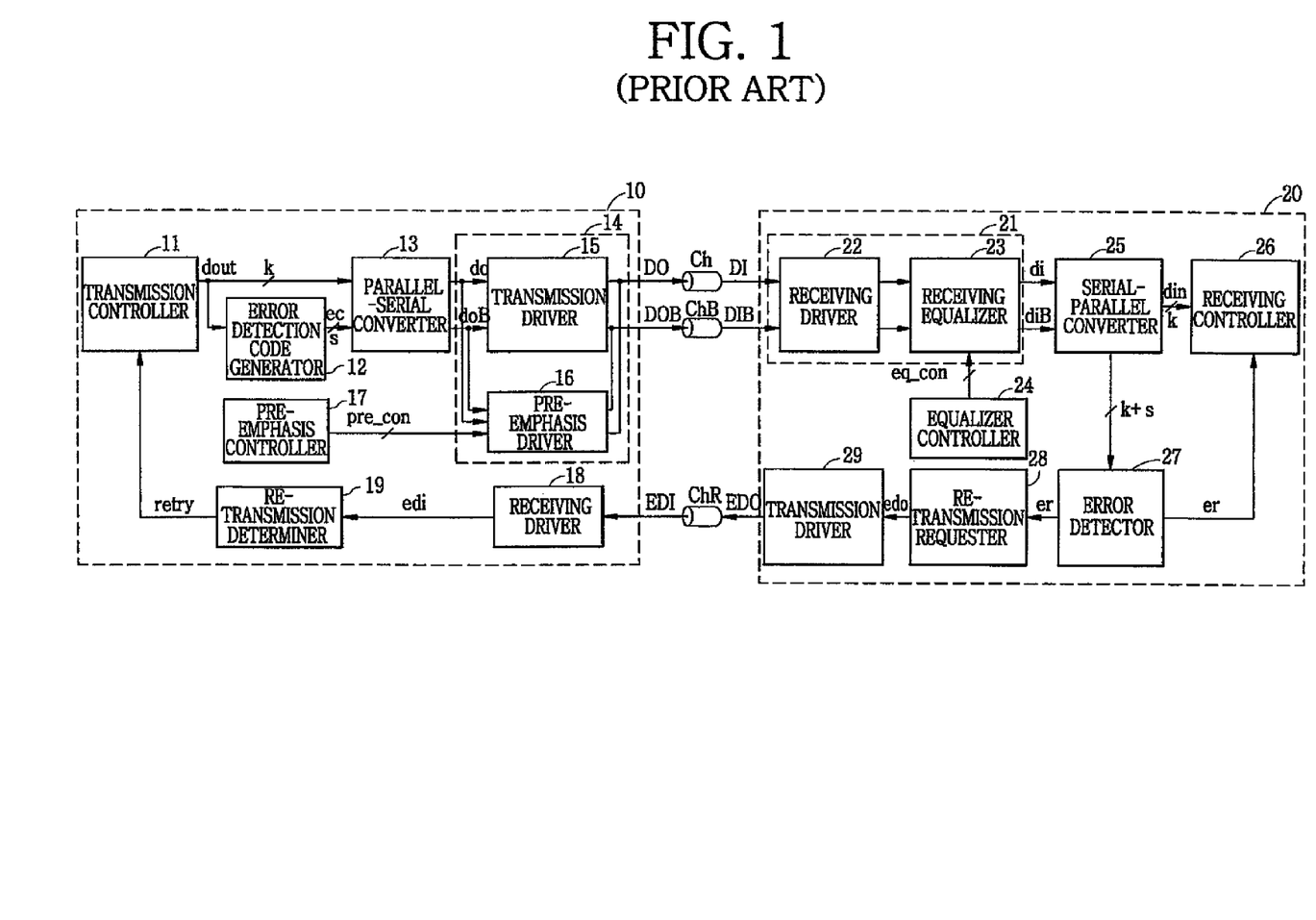
FIG. 1 is a block diagram of a conventional data transmitting and receiving system.

Consider for example the block diagram of a conventional data transmitting and receiving system shown in FIG. 1. In FIG. 1, a transmission unit 10 includes a transmission controller 11, an error detection code generator 12, a parallel-serial converter 13, an output driver 14, a pre-emphasis controller 17, a receiving driver 18, and a re-transmission determiner 19.

A receiving unit 20 includes an input driver 21, a serial-parallel converter 25, a receiving controller 26, an error detector 27, a re-transmission requester 28, and a transmission driver 29.

Data channels (e.g., Ch, ChB, through ChR) communicate data between transmission unit 10 and receiving unit 20.

As transmission controller 11 outputs k-bits output data (dout), error detection code generator 12 generate s-bits error detection code (ec). Parallel-serial converter 13 receives the k-bits output data (dout) and s-bits error detection code (ec), converts them into a single serial stream of data, and outputs differential output data (do and doB) derived from the serial stream of data.

As illustrated, output driver 14 includes a transmission driver 15 and a pre-emphasis driver 16. Output driver 14 receives the differential output data (do and doB) and generates differential data signals (DO and DOB). In its operation, transmission driver 15 performs impedance-matching the received differential output data (do and doB) with channels (Ch and ChB), differentially amplifies this data, and outputs the amplified, differential output data. Pre-emphasis driver 16 modifies the differential output data (do and doB) in relation to a pre-emphasis control signal (pre_con) provided by pre-emphasis controller 17. Following pre-emphasis, the amplified differential output data (do and doB) are transmitted as data signals (DO and DOB). That is, output driver 14 combines the outputs of transmission driver 15 and pre-emphasis driver 16 to generate pre-emphasized data signals (DO and DOB) which are communicated over channels Ch and ChB.

Inevitably, the data signals (DO and DOB) are distorted during respective transmission over channels Ch and ChB to become errant data signals (DI and DIB). The degree and type of data distortions will vary by channel.

Input driver 21 includes a receiving driver 22 and a receiving equalizer 23. Input driver 21 performs impedance matching in order to receive as much of the errant data signals (DI and DIB) through the channels Ch and ChB as possible. In so doing input driver 21 prevents undesired signal reflections, corrects certain data distortions caused by transmission characteristics of channels Ch and ChB, and subsequently outputs differential input data (di and diB). Then, receiving equalizer 23 equalizes the differential input data (di and diB) in response to an equalization control signal (eq_con) provided by an equalizer controller 24.

The serial-parallel converter 25 converts the serially-provided differential input data (di and diB) into parallel-provided k-bits input data (din) subsequently communicated to receiving controller 26 and s-bits error detection code (ec) subsequently communicated to error detector 27 in addition to the k-bits input data (din).

Error detector 27 analyzes the input data (din) and the error detection code (ec) and derives an error signal (er) when there one or more bit error(s) are present in the input data (din).

In the illustrated example, receiving controller 26 ignores the input data (din) when it contains one or more bit error(s) (or more bit error than can be compensated at the receiver side). However, when the input data (din) is error free, receiving controller 26 proceeds forward with the indicated operation.

In response to the error signal (er) from error detector 27, re-transmission requester 28 generates an error indication data (edo) indicating a request for data re-transmission, and communicates this signal to transmission unit 10 via transmission driver 29 and data channel ChR. In this example, transmission driver 29 receives the error indication data (edo) and converts it into an error indication signal (EDO) in relation to the transmission characteristics of channel ChR.

In turn, the error indication signal (EDO) may become distorted into distorted error indication signal (EDI) during communication through the channel ChR.

Receiving driver 18 receives the distorted error indication signal (EDI), corrects the distortion, and outputs a corrected error indication signal (edi). In response to the corrected error indication signal (edi), re-transmission determiner 19 outputs a re-transmission signal (retry) to transmission controller 11 when re-transmission is necessary and allows transmission controller 11 to re-transmit the errantly received data.

In the above description, "pre-emphasis" refers to a method of pre-emphasizing the relatively higher frequency components of output data signals at the transmitter since such signal components tend to undergo disproportionate attenuation during transmission. The pre-emphasis control signal (pre_con) is used as an optimal pre-emphasis coefficient adapted to minimize inter-symbol interference (ISI) between data bits due to the unique channel transmission characteristics.

Similarly, receiving equalizer 23 is configured in consideration the unique transmission characteristics of the channel. The equalization control signal (eq_con) is used as an optimal equalization coefficient that enables maximum signal decoding.

In general, the pre-emphasis coefficient and the equalization coefficient are pre-set within a data transmitting and receiving system. In other words, the pre-emphasis coefficient and the equalization coefficient are determined in consideration of system characteristics including channel characteristics in order to optimize the data transmitting and receiving system against systematic noise, as opposed to random noise. Therefore, when receiving unit 20 detects an error in the input data (din) and subsequently outputs an error indication signal (EDO) to transmission unit 10, transmission unit 10 necessarily assumes that the error has been caused by random noise effects. If that assumption proves correct, it is expected that the randomly appearing noise will not be present during re-transmission. As a result, data may be re-transmitted under the in the belief that it will be communicated without error.

However, in practice it is not easy to optimize the pre-emphasis and equalization coefficients of the data transmitting and receiving system. Even if it were, the pre-emphasis and equalization coefficients often need to be changed under various circumstances. In order to change the pre-set coefficients, conventional data transmitting and receiving systems require re-initialization. For example, a conventional data transmitting and receiving system must stop transmitting data, enter a mode setting operation, and output test data related to the mode setting operation. As a result, the performance of the conventional data transmitting and receiving system deteriorates. In addition, the data transmitting and receiving system may still generate bit errors under changing circumstances in spite of periodically performed mode setting operations.

SUMMARY OF THE INVENTION

Embodiments of the invention provides a data transmitting and receiving system capable of maintaining in real time an optimal data communication state by controlling various coefficients applied to transmitted and received data.

In one embodiment, the invention provides a data transmitting and receiving system comprising; a transmission unit transmitting an output data signal derived from output data and associated error detection code, the transmission unit comprising a pre-emphasis driver configured to pre-emphasize the output data signal before transmission, a channel having determined transmission characteristics and configured to communicate the output data signal from the transmission unit to a receiving unit, wherein the receiving unit comprises; an equalizer responsive to an equalization coefficient and configured to equalize the received output data signal, and an error detector configured to analyze input data and associated error detection code derived from the received output data signal and determine whether a bit error is present in the input data and generate an error signal upon determining the presence of a bit error, wherein upon determining successive bit errors in the input data, the receiving unit causes the equalization coefficient to be changed.

In another embodiment, the invention provides a data transmitting and receiving system comprising; a transmission unit configured to transmit output data signals via a channel to a receiving unit, wherein the transmission unit comprises; a transmission controller providing output data and controlling transmission of an output data signal, an output driver receiving the output data, and amplifying and pre-emphasizing the output data to generate the output data signal, wherein a pre-emphasis coefficient applied within the output driver defines the pre-emphasis of the output data signal, and a re-transmission determiner applying a re-transmission signal to the transmission controller in response to a return error indication signal associated with the output data as provided by the receiving unit, and a receiving unit configured to receive the output data signal from the channel, wherein the receiving unit comprises; an equalizer deriving input data by applying an equalization coefficient to the received output data signal, an error detector analyzing the input data and generating an error signal upon determining that the input data contains a bit error, and a re-transmission requestor generating the return error indication signal upon each occurrence of receiving the error signal from the error detector, wherein upon receiving N successive error signals associated with the output data signal, where N is a positive integer greater than 1, either: (a) the re-transmission requestor generates an equalization correction signal that changes the equalization coefficient applied in the equalizer; or (b) the re-transmission determiner generates a pre-emphasis correction signal that changes the pre-emphasis coefficient.

DESCRIPTION OF EMBODIMENTS

A data transmitting and receiving system according to an exemplary embodiment of the present invention will now be described more fully hereinafter with reference to the accompanying drawings.

Figure 2:
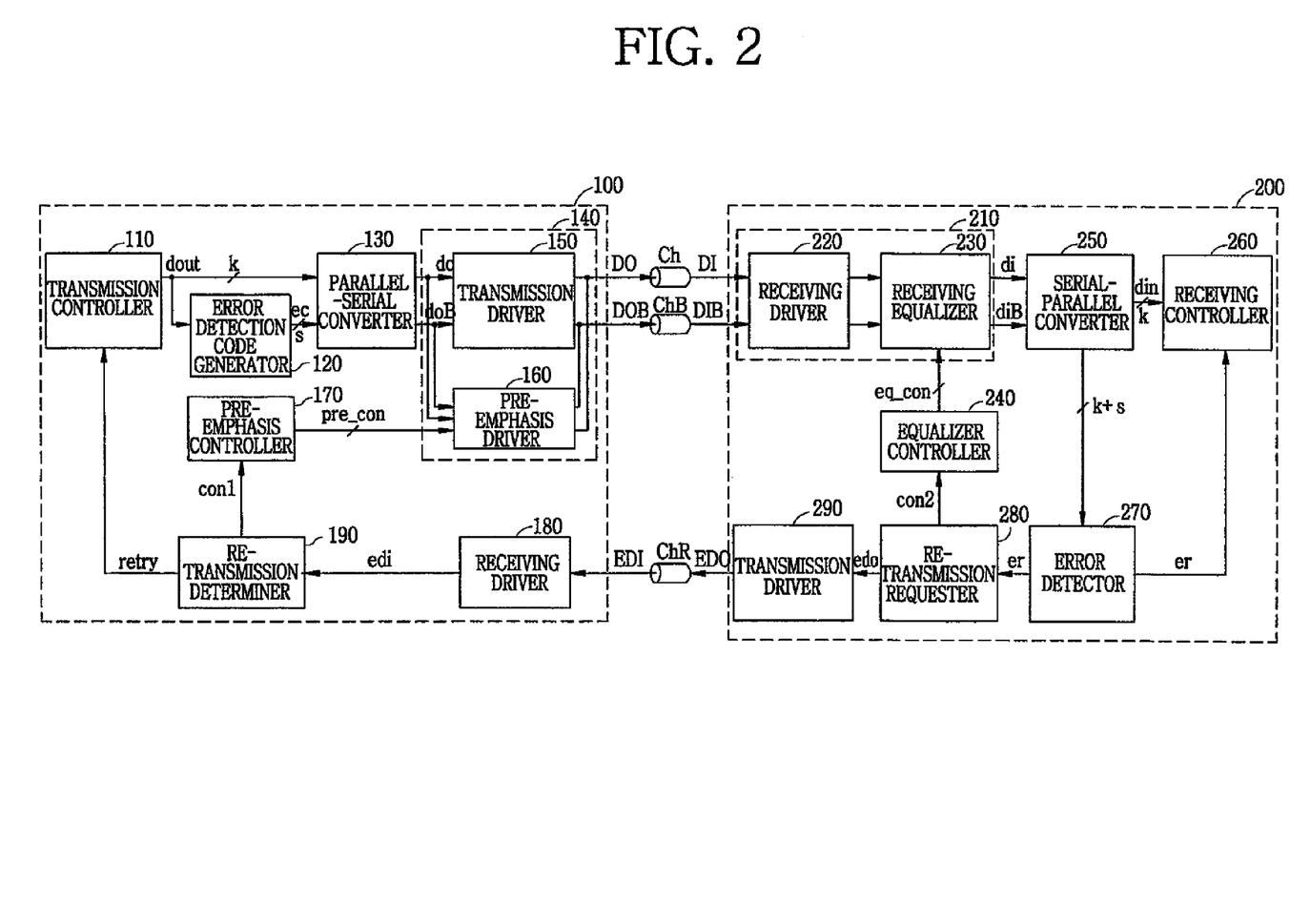
FIG. 2 is a block diagram of a data transmitting and receiving system according to an exemplary embodiment of the present invention.

FIG. 2 is a block diagram of a data transmitting and receiving system according to an exemplary embodiment of the present invention.

The data transmitting and receiving system includes a transmission unit 100 for transmitting data, a receiving unit 200 for receiving data, and channels Ch, ChB, and ChR for transmitting data between transmission unit 100 and receiving unit 200.

Transmission unit 100 includes a transmission controller 110, an error detection code generator 120, a parallel-serial converter 130, an output driver 140, a pre-emphasis controller 170, a receiving driver 180, and a re-transmission determiner 190.

Receiving unit 200 includes an input driver 210, an equalizer controller 240, a serial-parallel converter 250, a receiving controller 260, an error detector 270, a re-transmission requester 280, and a transmission driver 290.

As transmission controller 110 outputs k-bits output data (dout), error detection code generator 120 outputs s-bits error detection code (ec) associated with the output data (dout). Parallel-serial converter 130 receives the k-bits output data (dout) and the s-bits error detection code (ec), performs a parallel to serial conversion, and outputs differential output data (do and doB).

Output driver 140 receives the differential output data (do and doB), converts this data in relation to the transmission characteristics of channels Ch and ChB, and generates output data signal (DO and DOB).

In the illustrated embodiment, output driver 140 includes a transmission driver 150 and a pre-emphasis driver 160. Transmission driver 150 performs impedance-matching and differential amplification of the differential output data (do and doB). Pre-emphasis driver 160 converts the differential output data (do and doB) based on the characteristics of channels Ch and ChB in response to a pre-emphasis control signal (pre_con) provided by pre-emphasis controller 170, and outputs the converted data.

Output driver 140 combines the output signals from transmission driver 150 and the output signals from pre-emphasis driver 160 to generate output data signals (DO and DOB) suitable for transmission over channels Ch and ChB.

Channels Ch and ChB communicate the output data signals (DO and DOB) provided by transmission unit 100 to receiving unit 200 as distorted data signals (DI and DIB). That is, distorted data signals (DI and DIB) correspond respectively to the output data signals (DO and DOB), but have been distorted by the unique transmission characteristics of channels Ch and ChB.

Input driver 210 of receiving unit 200 includes a receiving driver 220 and a receiving equalizer 230 adapted to receive the distorted data signals (DI and DIB). Receiving driver 220 performs impedance matching in order to receive as much of the distorted data signals (DI and DIB) as possible without any undesired signal reflections. Also, receiving equalizer 230 restores data integrity to the distorted data signals (DI and DIB) in relation to an equalization control signal (eq_con) provided by equalizer controller 240, and thereafter outputs differential input data (di and diB).

Serial-parallel converter 250 receives the differential input data (di and diB), performs a serial to parallel conversion, and outputs k-bits input data (din) to receiving controller 260, and outputs s-bits error detection code (ec) along with the k-bits input data (din) to error detector 270.

Error detector 270 analyzes the input data (din) and the error detection code (ec), determines whether an error is present in the input data (din), and outputs an error signal (er) to receiving controller 260 and re-transmission requester 280 indicating the error in the input data (din).

Receiving controller 260 ignores the input data (din) when it contains an error, but regularly performs an indicated operation when the input data (din) is error free.

Re-transmission requester 280 outputs error indication data (edo) and a corresponding equalization correction signal (con2) in response to the error signal (er). Equalizer controller 240 receives the equalization correction signal (con2) from re-transmission requester 280 when it is necessary to adjust the equalization coefficient of receiving equalizer 230, and thereby change the value of the equalization control signal (eq_con).

Transmission driver 290 impedance matches the error indication data (edo) in relation to the transmission characteristics of the "return" channel ChR, amplifies the error indication data (edo), and thereby generates an error indication signal (EDO).

The error indication signal (EDO) may become distorted error indication signal (EDI) during its return communication through channel ChR to transmission unit 100. Receiving driver 180 of transmission unit 100 corrects distortion in the distorted error indication signal (EDI) to form return error indication data (edi).

In response to the return error indication data (edi), re-transmission determiner 190 outputs a re-transmission signal (retry) and a pre-emphasis correction signal (con1). The re-transmission signal (retry) is applied to transmission controller 110 in order to request re-transmission of the errant data, and the pre-emphasis correction signal (con1) is applied to pre-emphasis controller 170 in order to change the pre-emphasis control signal (pre_con).

In the data transmitting and receiving system shown in FIG. 2, when a bit error is apparent in the input data (din), it is assumed that the error is caused by random noise in the data channel, and a re-transmission of data is requested. However, when errors are detected in the same packet of input data (din) more than a predetermined number of times (i.e., following "N" retry attempts), it is assumed that the errors are being caused by systematic noise, so that the equalization coefficient used by receiving equalizer 230 and/or the pre-emphasis coefficient used by pre-emphasis driver 160 should be corrected. For example, when errors are detected in the same input data (din) twice or more, the equalization coefficient and/or the pre-emphasis coefficient may be corrected accordingly.

Thus, after transmission unit 100 first transmits the output data signals (DO and DOB) and error detector 270 in receiving unit 200 detects an error, re-transmission requester 270 does not output the equalization correction signal (con2), but outputs only the error indication data (edo). Also, when the corresponding error indication signal (EDO) is output from transmission driver 290 of receiving unit 200 to transmission unit 100, re-transmission determiner 190 does not generate the pre-emphasis correction signal (con1), but outputs only the re-transmission signal (retry) to allow transmission unit 100 to re-transmit data.

Therefore, since re-transmission requester 280 and re-transmission determiner 190 do not output the correction signals (con2 and con1), respectively, the pre-emphasis control signal (pre_con) and the equalization control signal (eq_con) output from pre-emphasis controller 170 and equalization controller 240 are unchanged.

However, if an error is again detected in re-transmitted data, re-transmission requester 280 outputs the equalization correction signal (con2) to equalization controller 240 so that equalization controller 240 may adjust the equalization control signal (eq_con). In response to the changed equalization control signal (eq_con), the equalization characteristics of receiving equalizer 230 are controlled so that data may be received without error.

In another embodiment, the pre-emphasis correction signal (con1) may be output from re-transmission determiner 190 of transmission unit 100 instead of outputting the equalization correction signal (con2) from re-transmission requester 280 of receiving unit 200. In this case, re-transmission determiner 190 of transmission unit 100 outputs the pre-emphasis correction signal (con1) so that pre-emphasis controller 170 may change the pre-emphasis control signal (pre_con). Thus, the pre-emphasis characteristics applied by pre-emphasis driver 160 may be controlled so that data is transmitted without error.

Although both the pre-emphasis correction signal (con1) and the equalization correction signal (con2) may be output at the same time, only one of them is normally output because simultaneously altering more than one feedback loop variable may result in data errors unrelated to a control signal variation. Thus, when a data transmitting and receiving system is implemented with a re-transmission determiner 190 and a re-transmission requester 280 capable of outputting their respective correction signals (con1 and con2), only one of these circuits is typically enabled at any given point in time relative to the generation of a correction signal.

Therefore, a data transmitting and receiving system such as the one shown in FIG. 2 is capable of re-transmitting data a predetermined number of times when there is an error in data transmission, and is further capable of preventing errors from occurring in the data transmission by correcting a pre-emphasis coefficient in transmission unit 100 or an equalization coefficient in receiving unit 200 when systemic errors are repeatedly detected. Assuming as is typical that the data transmitting and receiving system has been initialized in relation to the anticipated channel conditions, it will only necessary to minimally correct the pre-emphasis coefficient or the equalization coefficient.

Figure 3A:
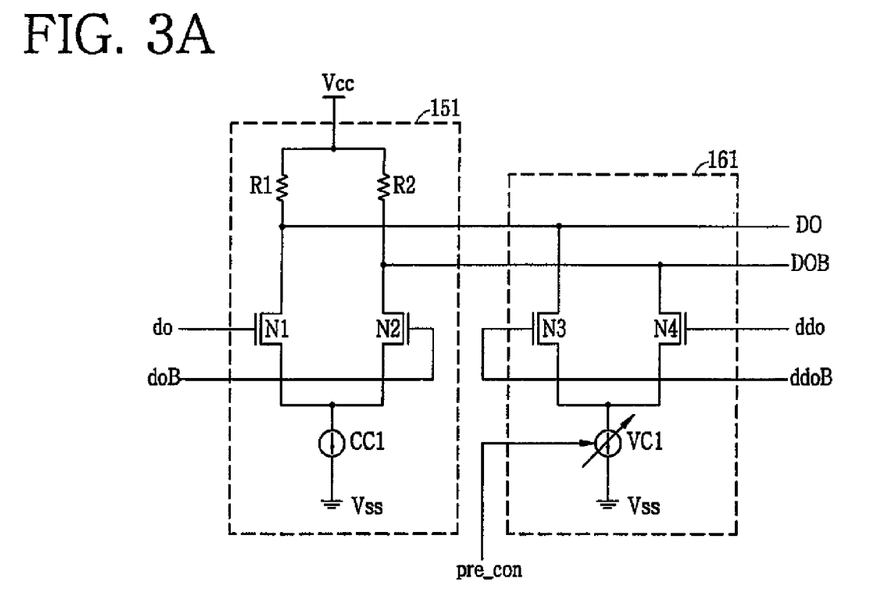
FIGS. 3A and 3B are circuit diagrams of an output driver shown in FIG. 2.
Figure 3B:
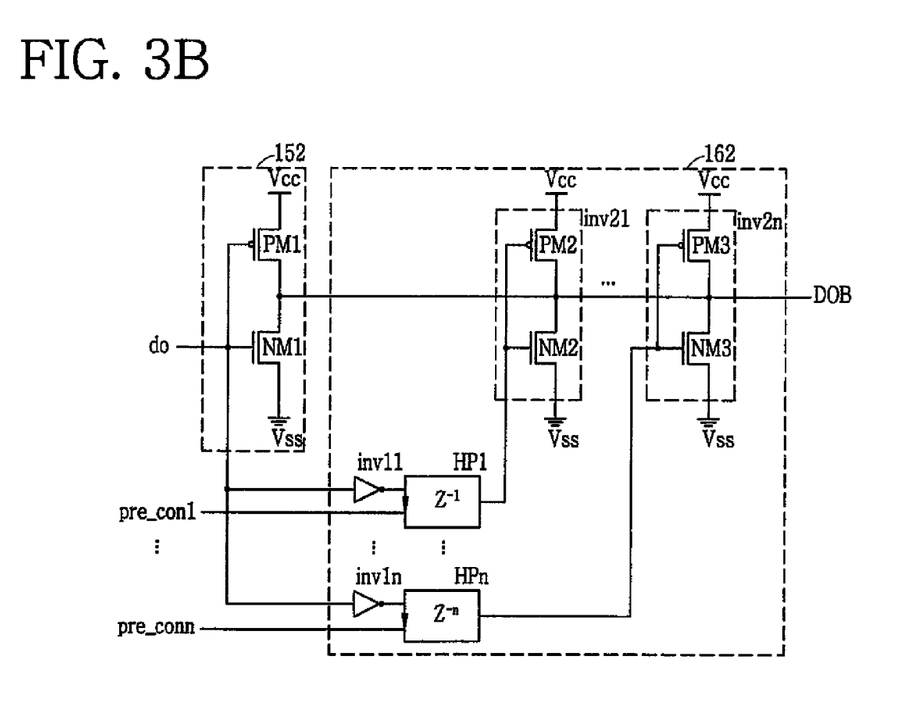

FIGS. 3A and 3B are circuit diagrams further illustrating the output driver shown in FIG. 2.

As noted, output driver 140 of FIG. 2 may includes transmission driver 150 and pre-emphasis driver 160. In FIG. 3A, a transmission driver 151 includes two NMOS transistors N1 and N2 as differential amplifiers. Thus, the NMOS transistors N1 and N2 differentially receive and amplify the differential output data (do and doB), respectively, and output the amplified data. Two resistors R1 and R2, which are connected to a power supply voltage Vcc, are loads used for impedance-matching. Typically, each of the resistors R1 and R2 has a defined resistance of (e.g.,) 50Ω. Also, a constant current source CC1 is connected to a ground voltage Vss and keeps the driving capability of the transmission driver 150 constant. Here, the constant current source CC1 is typically embodied by an NMOS transistor having a gate terminal to which a constant voltage is applied.

A pre-emphasis driver 161 of FIG. 3A has almost the same configuration as transmission driver 151. However, pre-emphasis driver 161 does not include a load for impedance-matching unlike transmission driver 151. In addition, pre-emphasis driver 161 does not receive the power supply voltage Vcc but is connected to an output signal of transmission driver 151 so that pre-emphasis driver 161 changes the output signals of transmission driver 151 and the output data signals (DO and DOB). Transmission driver 151 receives the differential output data (do and doB) as input signals, and pre-emphasis driver 161 receives, as input signals, delayed differential output data (ddo and ddoB) obtained by delaying the previous differential output data (do and doB) by a predetermined amount of time. Also, a variable current source VC1 is connected to the common ground voltage Vss so as to control the driving capability of pre-emphasis driver 161. The variable current source VC1 controls the amount of current in response to the pre-emphasis control signal "pre_con" output from pre-emphasis controller 170 and may be embodied by a plurality of NMOS transistors. In other words, the NMOS transistors of the variable current source VC1 have gate terminals to which respective bits of the pre-emphasis control signal "pre_con" are applied, and are enabled in response to the pre-emphasis control signal "pre_con" to control current supplied to the ground voltage Vss.

Therefore, in output driver 140 of FIG. 3A, when transmission driver 151 outputs output signals which are impedance-matched and amplified in response to the differential output data (do and doB), pre-emphasis driver 161 pre-emphasizes the output signals of transmission driver 151 and transmits output data signals (DO and DOB).

FIG. 3B illustrates another example of output driver 140 receiving only one data stream (i.e., a single output data—(do)) unlike output driver 140 of FIG. 3A which receives the differential output data (do and doB). A typical data transmitting and receiving system differentially transmits and receives data to enhance the accuracy of signals, but it is obvious that transmission unit 100 may output single data as well as differential data. When single data is output, two channels Ch and ChB need not be provided between transmission unit 100 and receiving unit 200, but (under the working assumptions illustrated above) only a single channel Ch is required, along with return channel ChR.

A transmission driver 152 of FIG. 3B is an inverter, which receives the single output data (do) as an input signal, inverts the output data (do), and outputs the inverted data.

A pre-emphasis driver 162 of FIG. 3B includes a first plurality of inverters (inv11 through inv1n), each of which receives and inverts the single output data (do), transfer portions (HP1, through HPn) which are enabled in response to pre-emphasis control signals (pre_con1 through pre_conn) output from pre-emphasis controller 170, delay the inverted single output data (do) by respectively different predetermined amounts of time, control the voltage levels of the delayed data, and output the data of which voltage levels are controlled. Pre-emphasis driver 162 also includes a second plurality of inverters (inv21 through inv2n), which receive the signals output from the transfer portions (HP1 through HPn) and output the signals at respectively different levels. The single output data (do) is output as output signals that are controlled to respectively different levels and delayed by respectively different predetermined amounts of time. Therefore, when transmission driver 152 receives the next single output data (do) and outputs the output signal, pre-emphasis driver 162 combines the output signals of second inverters (inv21 through inv2n) and outputs a pre-emphasized output data signal (DOB). Since the output data signal (DOB) is obtained by inverting and pre-emphasizing a single output data (do), receiving unit 200 must invert distorted data signal (DIB) received through channel "Ch".

Figure 4A:
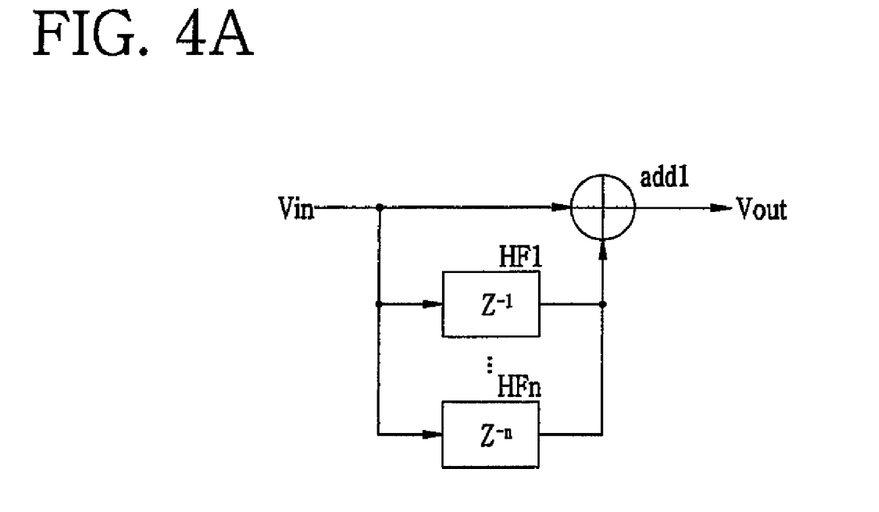
FIGS. 4A and 4B are block diagrams illustrating the operation of an equalizer.
Figure 4B:
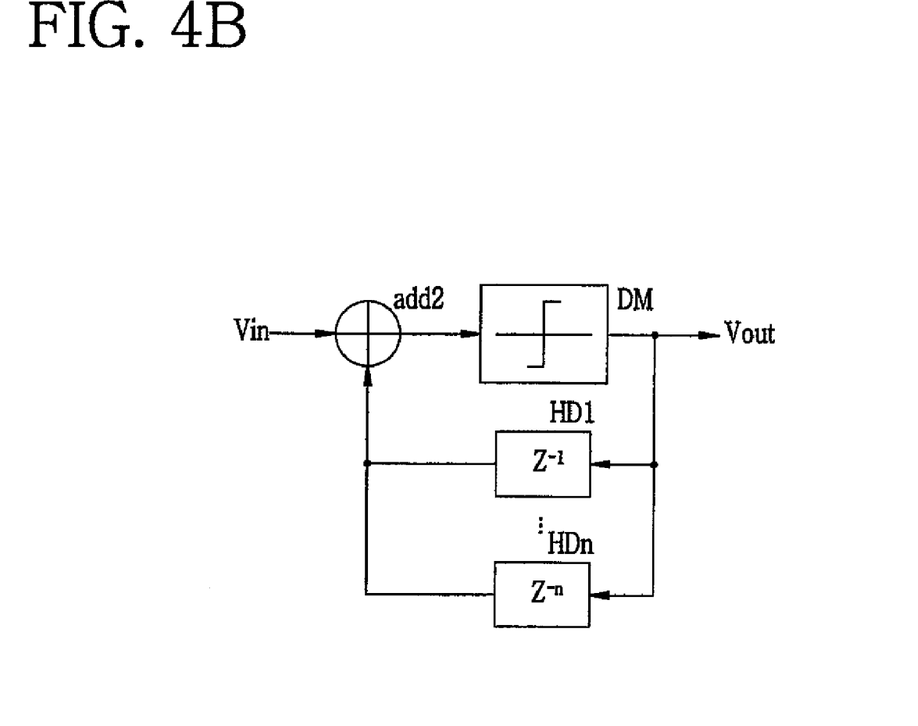

FIGS. 4A and 4B are block diagrams illustrating the possible implementations and corresponding operation of an equalizer adapted for use within embodiments of the invention. Typically, a feed forward equalizer (FFE) or a decision feedback equalizer (DFE) may be used as the equalizer. FIG. 4A illustrates an FFE including a plurality of transfer portions (HF1 through HFn), which receive an input signal (Vin), delays the input signal (Vin) for predetermined amounts of time, and output the delayed signals at respectively different levels. The transfer portions (HF1, . . . , and HFn) output the signals at respectively different levels in response to the input signal (Vin) when the next input signal (Vin) is applied and allow a combiner add1 to combine the output signals with the next input signal (Vin). In this case, the transfer portions (HF1 through HFn) are selectively enabled to control the equalization intensity of the input signal (Vin). In other words, the next input signal (Vin) is equalized with reference to the previous input signal (Vin).

FIG. 4B illustrates a DFE, which includes a plurality of transfer portions (HD1 through HDn) and a level determiner DM. When an input signal (Vin)$^#$ is applied to the DFE, the level determiner DM determines the level of the input signal (Vin) and outputs an output signal (Vout) at a "high" or "low" level. Then, the transfer portions (HD1 through HDn) receive the output signal (Vout), delay the output signal (Vout) for predetermined amounts of time, and output the delayed signals at respectively different levels. The respective signals output from the transfer portions (HD1 through HDn) are combined with the next input signal (Vin) by a combiner add2 and applied to the level determiner DM. In other words, the next input signal (Vin) is equalized with reference to the previous output signal (Vout).

The FFE operates at high speed, but makes it difficult to determine timing because it delays and outputs signals in an analog manner. In contrast, although the DFE operates at low speed by use of feedback, the DFE refers to an output signal (Vout) of which level is determined, so that it is resistant to noise.

Figure 5:
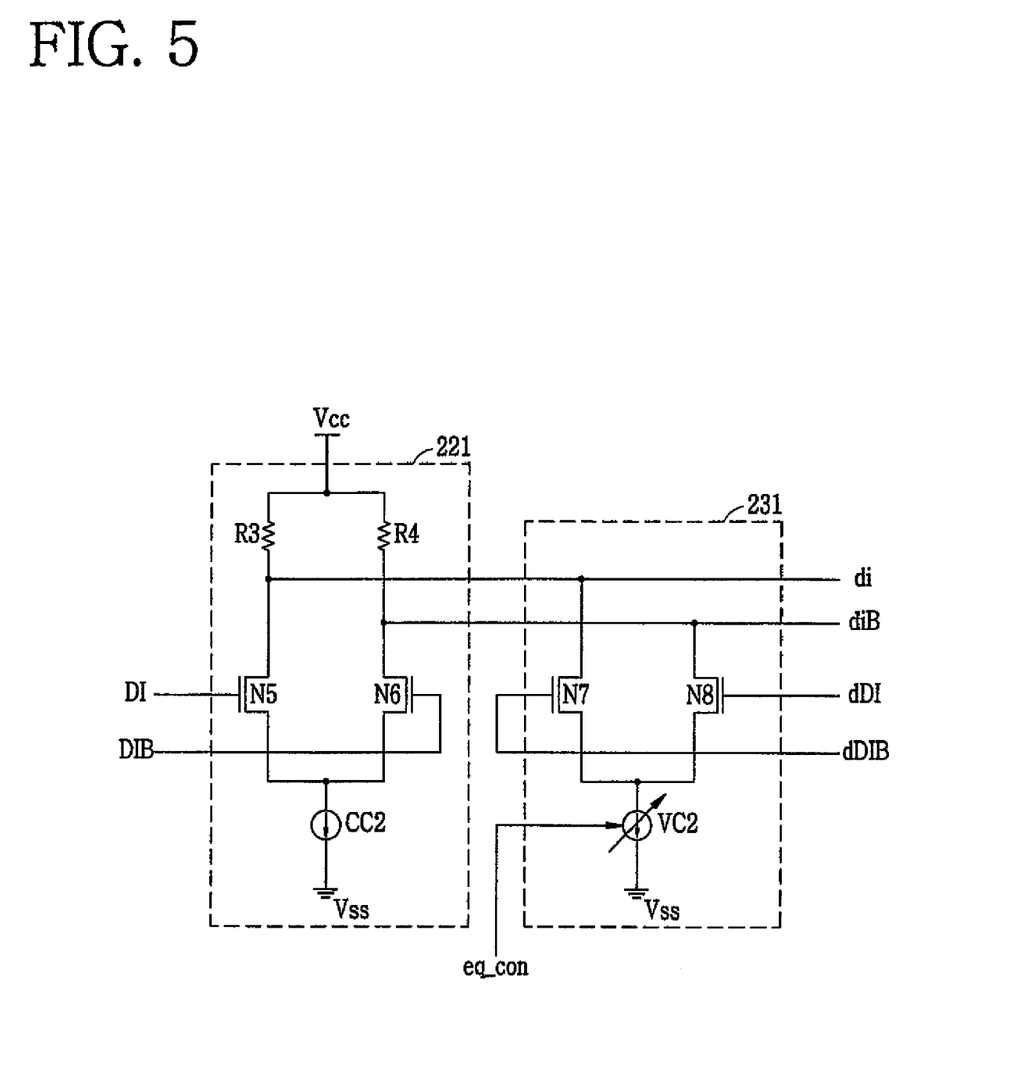
FIG. 5 is a block diagram of an input driver shown in FIG. 2.

FIG. 5 is a block diagram of an input driver adapted for use with the embodiment of the invention shown in FIG. 2. In FIG. 5, an FFE is used as input driver 210 of FIG. 2.

Input driver 210 includes a receiving driver 221 and a receiving equalizer 231 and has almost the same configuration as output driver 140 of FIG. 3A. Distorted data signals (DI and DIB) are received from transmission unit 100 through channels Ch and ChB into receiving driver 221. Receiving driver 221 includes two NMOS transistors N5 and N6 as differential amplifiers. Thus, the NMOS transistors N5 and N6 differentially receive and amplify the distorted data signals (DI and DIB) and output the amplified data. Like the resistors R1 and R2 of FIG. 3A, two resistors R3 and R4, which are connected to a power supply voltage Vcc, are loads used for impedance-matching. Typically, each of the resistors R3 and R4 has a resistance of 50Ω. Also, a constant current source CC2 is connected to a ground voltage Vss and keeps the driving capability of receiving driver 221 constant. Here, the constant current source CC2 is typically embodied by an NMOS transistor having a gate terminal to which a constant voltage is applied.

Receiving equalizer 231 does not receive the power supply voltage Vcc but is connected to an output terminal of receiving driver 221 so that receiving equalizer 231 changes the output signals of receiving driver 221 and outputs differential input data (di and diB). Receiving driver 221 receive the distorted data signals (DI and DIB) as input signals, and receiving equalizer 231 receives, as input signals, delayed distorted data signals (dDI and dDIB) obtained by delaying the received distorted data signals (DI and DIB) by a predetermined amount of time. Also, a variable current source VC2 is connected to a common ground voltage Vss so as to control the driving capability of receiving equalizer 231. The variable current source VC2 controls the amount of current in response to the equalization control signal (eq_con) output from equalization controller 240 and may be embodied by a plurality of NMOS transistors. In other words, the NMOS transistors of the variable current source VC2 have gate terminals to which respective bits of the equalization control signal (eq_con) are applied, and are enabled in response to the equalization control signal (eq_con) to control current supplied to the ground voltage Vss.

Therefore, within input driver 210 of FIG. 5, when receiving driver 221 amplifies the distorted data signals (DI and DIB) and performs impedance-matching of the amplified data, receiving equalizer 231 equalizes the output signals of receiving driver 221 and outputs the differential input data (di and diB).

According to the present invention as described above, when bit errors are detected more than a predetermined number of times during communication of data, a data transmitting and receiving system may be adjusted to a more optimal state of operation by correcting a pre-emphasis coefficient in the transmission unit or an equalization coefficient in the receiving unit without interrupting its regular operation to run a specialized mode designed to optimize system performance. Therefore, a data transmitting and receiving system according to an embodiment of the invention may efficiently operated in real time without data loss.

Exemplary embodiments of the invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the scope of the present invention as set forth in the following claims.

What is claimed is:

1. A data transmitting and receiving system comprising:
   a transmission unit transmitting an output data signal derived from output data and associated error detection code, the transmission unit comprising a pre-emphasis driver configured to pre-emphasize the output data signal before transmission;
   a channel having determined transmission characteristics and configured to communicate the output data signal from the transmission unit to a receiving unit;
   wherein the receiving unit comprises:
   a first receiving driver configured to perform impedance-matching with the channel and further configured to amplify the received output data signal;
   an equalizer responsive to an equalization coefficient and configured to equalize the received and amplified output data signal;
   an error detector configured to analyze input data and associated error detection code derived from the received output data signal and determine whether a bit error is present in the input data and generate an error signal upon determining the presence of a bit error;
   a receiving controller configured to receive the input data and execute an operation associated with the input data in the absence of the error signal received from the error detector;
   a re-transmission requester configured to output error indication data and an equalization correction signal in response to the error signal;
   an equalization controller configured to change the equalization coefficient in response to the equalization correction signal; and
   a first transmission driver outputting an error indication signal derived from the error indication data received from the re-transmission requester,
   wherein upon determining successive bit errors in the input data, the receiving unit causes the equalization coefficient to be changed.

2. The system of claim 1, wherein the equalizer is further configured to delay previous input data derived from a previous received output data signal by a predetermined amount of time, shift the level of the delayed input data, and equalize the input data by combining the level-shifted, delayed data with the amplified input data from the first receiving driver.

3. The system of claim 2, wherein the equalizer is a feed forward equalizer (FFE).

4. The system of claim 2, wherein the equalizer is a decision feedback equalizer (DFE).

5. The system of claim 1, wherein the pre-emphasis driver operating with a second transmission driver to pre-emphasize the output data signal generated from the output data and associated error detection code, and the transmission unit further comprises:
- a transmission controller configured to provide output data;
- an error detection code generator configured to generate the error detection code;
- a pre-emphasis controller configured to output a pre-emphasis coefficient controlling the pre-emphasis driver;
- a receiving driver configured to receive the error indication signal; and
- a re-transmission determiner configured to provide a re-transmission signal to the transmission controller in response to return error indication data derived from the received error indication signal.

6. The system of claim 5, wherein the second transmission driver performs impedance-matching with the channel and amplifies the output data received from the transmission controller; and
  the pre-emphasis driver is configured to delay previous output data by a predetermined amount of time, shift the level of the delayed output data, and pre-emphasize the output data by combining the level-shifted, delayed output data with the output data.

7. A data transmitting and receiving system comprising:
- a transmission unit configured to transmit output data signals via a channel to a receiving unit, wherein the transmission unit comprises:
  - a transmission controller providing output data and controlling transmission of the output data signal;
  - an output driver receiving the output data, and amplifying and pre-emphasizing the output data to generate the output data signal, wherein a pre-emphasis coefficient applied within the output driver defines the pre-emphasis of the output data signal; and,
  - a re-transmission determiner applying a re-transmission signal to the transmission controller in response to a return error indication signal associated with the output data as provided by the receiving unit; and,
- a receiving unit configured to receive the output data signal from the channel, wherein the receiving unit comprises:
  - an equalizer deriving input data by applying an equalization coefficient to the received output data signal;
  - an error detector analyzing the input data and generating an error signal upon determining that the input data contains a bit error; and,
  - a re-transmission requestor generating the return error indication signal upon each occurrence of receiving the error signal from the error detector;
  wherein upon receiving N successive error signals associated with the output data signal, where N is a positive integer greater than 1, either
  (a) the re-transmission requestor generates an equalization correction signal that changes the equalization coefficient applied in the equalizer, or
  (b) the re-transmission determiner generates a pre-emphasis correction signal that changes the pre-emphasis coefficient.

8. The system of claim 7, wherein the pre-emphasis coefficient is initially defined in relation to transmission characteristics of the channel.

9. The system of claim 8, wherein the transmission unit further comprises:
- an error detection code generator generating error detection code associated with the output data;
- a parallel-serial converter incorporating the error detection code into the output data and generating the output data as differential output data; and,
- wherein the output driver comprises a transmission driver receiving the differential output data and a pre-emphasis driver receiving the differential output data and a pre-emphasis control signal from a pre-emphasis controller, the transmission driver and pre-emphasis driver cooperating to generate the output data signals as differential output data signals.

10. The system of claim 9, wherein the pre-emphasis controller receives the pre-emphasis correction signal from the re-transmission determiner and changes the pre-emphasis coefficient in response thereto.

11. The system of claim 7, wherein the equalization coefficient is initially defined in relation to transmission characteristics of the channel.

12. The system of claim 11 wherein the output data signal comprises differential output data signals, and the equalizer derives differential input data from the differential output data signals, and wherein the receiving unit further comprises:
- a receiving controller executing an operation in relation to input data;
- a serial-parallel converter receiving the differential input data from the equalizer, separating input data and error detection code from the differential input data, and providing the input data to the receiving controller and the input data and error detection code to the error detector.

13. The system of claim 12, wherein the receiving unit further comprises:
- an equalizer controller storing the equalization coefficient and changing the equalization coefficient in response to the equalization correction signal provided by the re-transmission requester.

14. The system of claim 12, wherein the error signal generated by the error detector is applied to the receiving controller, such that upon detection of a bit error in the input data the receiving controller omits execution of the operation.

15. The system of claim 7, wherein the equalizer is a feed forward equalizer (FFE).

16. The system of claim 7, wherein the equalizer is a decision feedback equalizer (DFE).

* * * * *